United States Patent [19]

Shemtov

[11] 4,159,134
[45] Jun. 26, 1979

[54] ELECTRICAL CONDUIT CONNECTOR
[75] Inventor: Sami Shemtov, Brooklyn, N.Y.
[73] Assignee: Gould, Inc., East Farmingdale, N.Y.
[21] Appl. No.: 834,214
[22] Filed: Sep. 19, 1977
[51] Int. Cl.² .............................................. F16L 21/06
[52] U.S. Cl. .................................... 285/322; 10/86 R; 85/32 V; 285/386; 285/391
[58] Field of Search ...................... 85/32 V; 174/75 R; 285/341, 391, 386, 354, 322; 10/86 R, 86 A

[56] References Cited
U.S. PATENT DOCUMENTS

| 1,008,551 | 11/1911 | Lorenz | 285/391 |
| 1,059,438 | 4/1913 | Clark | 285/354 |
| 2,552,768 | 5/1951 | Brophy | 285/386 X |
| 3,794,362 | 2/1974 | Mooney | 285/341 X |
| 4,019,762 | 4/1977 | Eidelberg | 285/341 X |

Primary Examiner—Dave W. Arola
Attorney, Agent, or Firm—Howard C. Miskin

[57] ABSTRACT

A conduit connector includes an inner externally threaded member having an expanded medial hexagonal section, the opposite threaded end being engaged by nut members carrying compressible clamping rings. Each of the nuts is produced from a short length of cylindrical tubing or may be drawn from sheet stock whose outer section is expanded to form a hexagonal portion terminating in an inwardly directed lip and joining at its inner end an inner cylindrical collar section. The nut is then internally threaded to form a continuous thread in the collar section and an extending discontinuous thread on the inner face of the hexagonal section.

9 Claims, 6 Drawing Figures

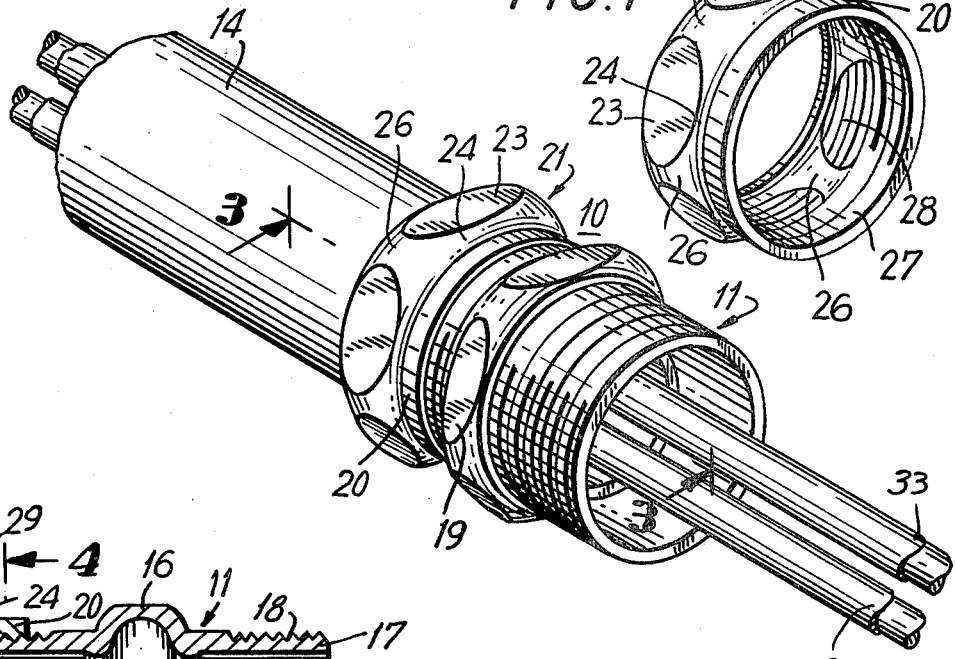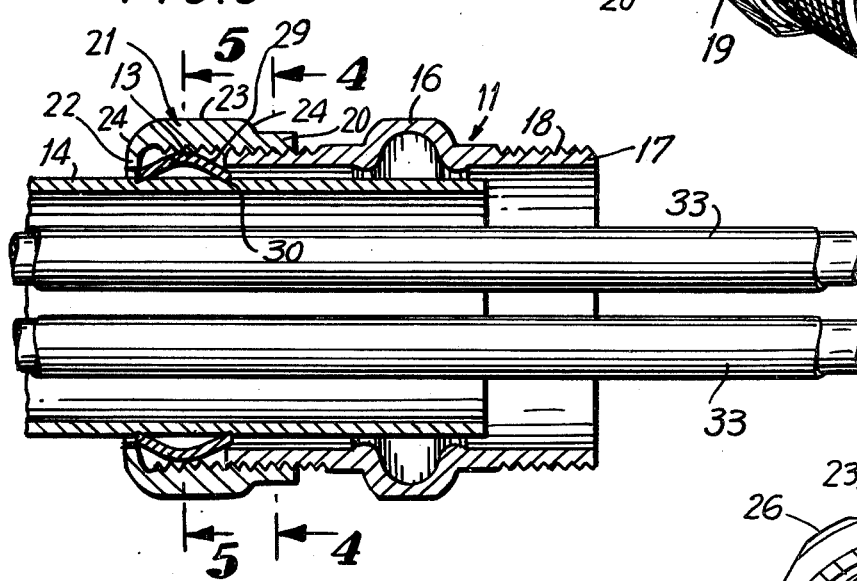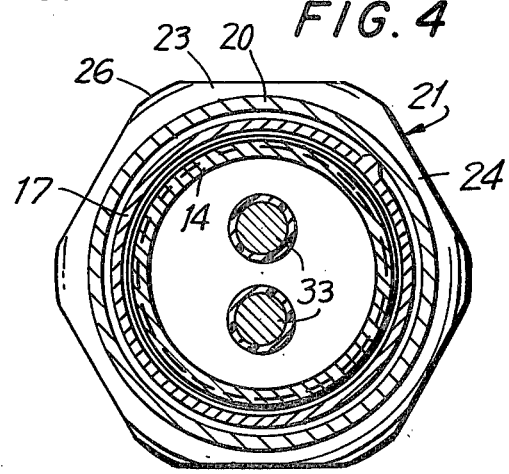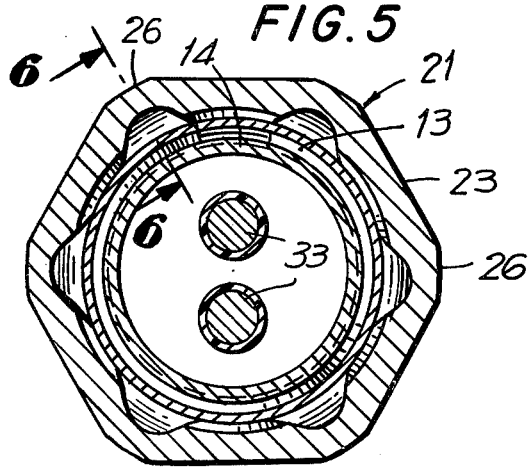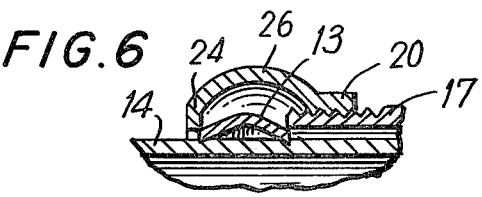

1

ELECTRICAL CONDUIT CONNECTOR

BACKGROUND OF THE INVENTION

The present invention relates to improvements in conduit couplings and connectors and it relates more particularly to an improved nut member in an electrical conduit connector or coupling and to an improved method of producing the same.

It is frequently necessary in electrical installations to firmly couple or connect unthreaded electrical conduit in coaxial end-to-end relationship or to secure conduit to a junction box or the like. To this end it is a common practice to employ an end-to-end conduit coupling or connector which conventionally includes an intermediate tubular member having an outer hexagonal medial section and externally threaded end sections and a pair of clamp rings carrying internally threaded hexagonal nuts engaging the threaded sections of the intermediate member. An important requirement of the coupling is that it be not only rugged and reliable but also of low cost. They are accordingly usually mass produced, the nut members being fabricated from extruded hexagonal tubing which is then internally threaded. The threads in the conventionally produced connector steel nuts are accordingly discontinuous or interrupted peripherally along their full length and this leads to great drawbacks. In applying and tightening the nut to the male intermediate section mismatching and crossing of the internal and external threads frequently occur, thereby interfering with the application and tightening of the nut and resulting in an unreliable and often loose and misaligned coupling and other disadvantages.

SUMMARY OF THE INVENTION

It is a principal object of the present invention to provide an improved coupling or connector for pipe, conduit and the like.

Another object of the present invention is to provide an improved method for the production of pipe and conduit connectors.

Still another object of the present invention is to provide an improved electrical conduit connector and an improved method of producing the same.

A further object of the present invention is to provide an improved conduit connector nut and an improved method of producing the same.

Still, a further object of the present invention is to provide a device of the above nature characterized by its reliability, ease of application, low cost, ease of mass production, ruggedness, simplicity and high versatility and adaptability.

The above and other objects of the present invention will become apparent from a reading of the following description taken in conjunction with the accompanying drawings which illustrate a preferred embodiment thereof.

In a sense, the present invention contemplates the provision of an improved conduit coupling device which comprises an externally threaded tubular male member and a nut engaging the threaded male member and including an inner cylindrical collar section joining a coaxial outwardly radially expanded polygonal outer section, said collar section being continuously internally threaded and said polygonal section being internally threaded as a continuation of said collar thread, said polygonal section thread being interrupted between successive inside polygonal faces of said polygonal section. A split gripping or clamping ring is disposed between the nut outer lip and the confronting end face of the male member and is of outwardly convex axial cross section, so that upon tightening of the nut the ring is compressed and bites into and tightly engages a registering conduit.

In the preferred form of the improved coupling, the male member is externally threaded on opposite ends with the expanded polygonal outer section terminating in an inwardly directed peripheral lip and is provided intermediate its ends with an outly expanded medial section, a nut as described above, engaging each of the male member threaded ends.

In the fabrication of the improved nut member a cylindrical tubular short metal blank is expanded to form the outer polygonal section terminating at one end in the inwardly directed peripheral lip and at the other end in a short coaxial collar whose inside face is tangent with the inside faces of the polygonal section at their medial parts. A thread is then formed inside the collar which extends along the polygonal section inside faces and is interrupted at the corners of the polygonal section.

The improved connector is simple, rugged and inexpensive, and may be rapidly and reliably applied, the construction of the nut obviating any cross threading and their consequent drawbacks. The improved method of fabricating the nut is simple and efficient and employs conventional equipment and the nuts may be mass produced.

BRIEF DESCRIPTION OF THE DRAWINGS

FIG. 1 is a perspective view of a conduit connector nut member embodying the present invention;

FIG. 2 is a perspective view of the improved assembled conduit connector shown applied to one conduit;

FIG. 3 is a sectional view taken along line 3—3 in FIG. 2;

FIG. 4 is a sectional view taken along line 4—4 in FIG. 3;

FIG. 5 is a sectional view taken along line 5—5 in FIG. 3; and

FIG. 6 is fragmentary sectional view taken along line 6—6 in FIG. 5.

DESCRIPTION OF THE PREFERRED EMBODIMENT

Referring now to the drawings which illustrate a preferred embodiment of the present invention, the reference numeral 10 generally designates the improved electrical conduit coupling or connector which includes an intermediate or male member, a pair of similarly constructed tightening nut members 12 and a conduit gripping or clamping split ring 13 registering with each of the nut members 12. It should be noted that in the illustrated connector 10, although only one nut member 12 and clamp ring 13 are shown, a nut member and clamp ring are provided at each end of the connector 10. Moreover, the improved nut member 12 may be employed with other forms of connectors or couplings. Further, while only one electrical conduit 14 is shown engaged by the connector 10, a pair of conduits are generally so engaged end-to-end at opposite ends of the connector 10.

The male connector member 11 is integrally formed of metal and includes an expanded hexagonal hollow medial section 16 and opposite cylindrical tubular end collar sections 17 provided with external threads 18.

The faces 19 of medial section 16 are oval and flat and join the adjacent collars 17 by rounded side walls and are joined end-to-end by rounded corners.

Each of the nut members 12, in accordance with the present invention, is an integrally formed metal unit and includes a short inner cylindrical collar section 20 joined at its rear in an outwardly expanded hexagonal or other polygonal section 21 which terminates at its rear in an inwardly directed peripheral lip 22. The hexagonal section 21 includes six angularly related oval shaped planar side walls 23 which join the collar section 20 and the peripheral lip 22 by inwardly directed peripheral curved walls 24 and which are joined to adjacent side walls 23 by outwardly convex curved corners 26. The inside faces of the side walls 23 lie in planes tangent to the inside face of the collar 20.

The inside face of the collar section 20 is threaded as at 27 and extends for the full length thereof. The thread 27 extends longitudinally inwardly along the inside faces of the hexagon side walls 23 to form thread sections 28 which are peripherally interrupted by the radially outwardly disposed hexagon corners 26 and taper approaching the outer longitudinal edges of the inside faces of the side walls 23. Thus, a single multiple convolution thread is formed on the inside face of the nut member 12 including the continuous thread section 27 and the peripherally interrupted sections 28.

In the assembled condition of the connector 10, a threaded collar section 27 of a nut member 12 engages each of the male member externally threaded sections 18. A resilient split clamping ring 13 is disposed within each of the nut members 12 between the confronting faces of corresponding lip 22 and end of the male member collar section 17. The ring 13 is outwardly convex and inwardly concave to provide inwardly directed peripheral legs terminating in peripheral biting edges 30.

Each of the nut members 12 is formed advantageously from a circular cylindrical tubular metal blank which is expanded by the use of known procedures and techniques to form the enlarged hexagonal section 21 and lip 22 while leaving the collar 20. The collar 20 and the inside faces of the hexagon side faces 23 are threaded or tapped, likewise by known techniques to produce the threaded sections 27 and 28. The connector device is then assembled by inserting a split ring 13 into each of the nut members 12 and applying a ring carrying nut member 12 to each of the male member threaded collars 17 and tightening the nut member until the lips 22 and the ends of the collar sections 17 just bear on the opposing ring legs 29. The nut members 12 may be drawn from sheet stock to form its end configuration. Further lip 22 may be eliminated and a longitudinally extending outwardly directed neck may be substituted instead.

In coupling a pair of conduits end-to-end, their ends are inserted into the open opposing ends of the connector device 10 and brought into close proximity. The nut members 12 are then tightened to longitudinally compress and peripherally contract the split clamp rings 13 and cause the peripheral edges 30 thereof to bite into and tightly grip the outside faces of the conduits 14. The conduits 14 are thereby tightly coupled and releasably retained in end-to-end position and cables or conductors 33 may then be advanced through the end-to-end conduits 14 in the known manner. Also the nut member 12 may be used to secure or attach cable to a junction box or the like and to connectors.

While there has been illustrated and described a preferred embodiment of the present invention, it is apparent that numerous alterations, omissions, and additions may be made without departing from the spirit thereof.

I claim:

1. A nut structure integrally formed of metal comprising a polygonal annular body section including a medial portion with peripherally spaced angularly related side walls and annular walls radially inwardly directed from opposite ends of said medial portion and a coaxial collar section extending longitudinally outwardly from the inner peripheral edge of one of said annular walls, the inside face of said collar and the inside face of said side walls being helically continuously threaded, the threads in said side walls being interrupted between successive side walls and the threads in said collar inside face being uninterrupted.

2. The nut structure of claim 1 wherein the inside faces of said side walls lie in respective planes tangent to the inside face of said collar section.

3. The nut structure of claim 1 wherein said side walls are of oval configuration.

4. The nut structure of claim 1 wherein successive side walls are joined by curved corner sections.

5. The nut structure of claim 1 wherein the depths of said threads in said side wall inside faces diminish approaching the ends of the respective walls.

6. A conduit coupling device including the nut structure of claim 1 comprising a resilient split clamping ring disposed within said body section adjacent to said annular wall remote from said collar section.

7. The coupling device of claim 5, comprising an externally threaded cylindrical tubular male member screw engaging said collar section and having an end portion bearing on said split ring.

8. The method of producing a conduit coupling nut comprising the steps of radially outwardly expanding a first portion of a circular tubular blank to form a polygonal annular body section including peripherally spaced side walls and coaxial annular walls radially inwardly directed from said polygonal annular body section and then internally threading a second portion of said tubular blank and said body section at a uniform diameter to form a continuous helical thread with the threads in said side walls being interrupted between successive side walls and the threads in said blank second portion being uninterrupted.

9. The nut structure of claim 1 wherein said body section is formed of one portion of a circular cylindrical tubular metal blank with a second portion of said blank defining said coaxial collar section.

* * * * *